US010762073B2

(12) United States Patent
Pfeifle et al.

(10) Patent No.: US 10,762,073 B2
(45) Date of Patent: Sep. 1, 2020

(54) REDUCING SIZE OF UPDATE PACKAGE DATA FOR NAVIGATION DATABASES

(71) Applicant: HERE Global B.V., Eindhoven (NL)

(72) Inventors: Martin Pfeifle, Seewald (DE); Armen Poghosov, Berlin (DE)

(73) Assignee: HERE GLOBAL, B.V., Eindhoven (NL)

(*) Notice: Subject to any disclaimer, the term of this patent is extended or adjusted under 35 U.S.C. 154(b) by 211 days.

(21) Appl. No.: 15/667,798

(22) Filed: Aug. 3, 2017

(65) Prior Publication Data
US 2018/0039665 A1 Feb. 8, 2018

Related U.S. Application Data

(60) Provisional application No. 62/370,771, filed on Aug. 4, 2016.

(51) Int. Cl.
G06F 16/00 (2019.01)
G06F 16/23 (2019.01)
(Continued)

(52) U.S. Cl.
CPC ......... G06F 16/2329 (2019.01); G01C 21/32 (2013.01); G06F 3/0641 (2013.01);
(Continued)

(58) Field of Classification Search
CPC .................................................. G06F 16/2329
(Continued)

(56) References Cited

U.S. PATENT DOCUMENTS 5,832,520 A 11/1998 Miller
6,121,924 A 9/2000 Meek et al.
(Continued)

FOREIGN PATENT DOCUMENTS

EP 3 040 855 7/2016
WO WO 2016/193408 12/2016

OTHER PUBLICATIONS

*TomTom Developer Portal—NDS Map Updates* [online] [retrieved Oct. 13, 2017]. Retrieved from the Internet: <URL: https://web.archive.org/web/20161018105708/https://developer.tomtom.com/products/realtimemaps/ndsmapupdates>. (2016) 2 pages.
(Continued)

*Primary Examiner* — Chelcie L Daye
(74) *Attorney, Agent, or Firm* — Alston & Bird LLP

(57) ABSTRACT

A method includes identifying, in or after a second process of compiling data that yields a second navigation database, a navigation data item having a changed position in a list of the second navigation database. The changed position is different to a previous position of the navigation data item in a list of a first navigation database which is yield from a first process of compiling data performed before the second process of compiling data. The method also includes generating first update data for updating the first navigation database to an intermediate navigation database in a first updating step. The first update data represents generic update instructions and/or information for changing a data reference pointing to the previous position of the identified navigation data item to a data reference pointing to the changed position of the identified navigation data item. Corresponding apparatuses and computer readable storage mediums are also provided.

17 Claims, 7 Drawing Sheets

(51) Int. Cl.
*G06F 16/29* (2019.01)
*G06F 16/27* (2019.01)
*G01C 21/32* (2006.01)
*G06F 3/06* (2006.01)

(52) U.S. Cl.
CPC ............ *G06F 16/23* (2019.01); *G06F 16/273* (2019.01); *G06F 16/29* (2019.01)

(58) Field of Classification Search
USPC .......................................... 707/695, 620, 679
See application file for complete search history.

(56) References Cited

U.S. PATENT DOCUMENTS

| | | | |
|---|---|---|---|
| 7,877,203 B2 | 1/2011 | Mikuriya et al. | |
| 8,228,803 B1 | 7/2012 | Ge et al. | |
| 8,275,782 B2 | 9/2012 | Hirsch et al. | |
| 8,280,850 B2 | 10/2012 | Lauther | |
| 8,352,523 B1 | 1/2013 | Sim-Tang | |
| 8,886,599 B2 * | 11/2014 | Wellman | G06F 16/258 707/620 |
| 9,015,200 B2 | 4/2015 | Pfeifle et al. | |
| 9,575,993 B2 | 2/2017 | Pfeifle | |
| 9,613,527 B2 | 4/2017 | Pfeifle | |
| 9,798,740 B2 | 10/2017 | Pfeifle | |
| 2004/0085227 A1 | 5/2004 | Mikuriya et al. | |
| 2005/0058155 A1 | 3/2005 | Mikuriya et al. | |
| 2005/0091223 A1 | 4/2005 | Shaw et al. | |
| 2008/0216066 A1 | 9/2008 | Oh | |
| 2010/0023554 A1 | 1/2010 | Fujimoto et al. | |
| 2010/0076671 A1 | 3/2010 | Pryakhin et al. | |
| 2010/0312757 A1 | 12/2010 | Meschenmoser et al. | |
| 2011/0173601 A1 | 7/2011 | de los Reyes | |
| 2012/0209818 A1 * | 8/2012 | Richter | G06F 16/29 707/690 |
| 2013/0083806 A1 | 4/2013 | Suarez et al. | |
| 2014/0081922 A1 * | 3/2014 | Kunath | G06F 16/21 707/679 |
| 2014/0101096 A1 | 4/2014 | Pfeifle et al. | |
| 2017/0219357 A1 | 8/2017 | Pfeifle | |
| 2018/0173723 A1 | 6/2018 | Pfeifle et al. | |

OTHER PUBLICATIONS

Extended European Patent Application No. 17181456.9 dated Jan. 4, 2018, 7 pages.
Diff Utility—Wikipedia [online] [retrieved Jan. 30, 2020]. Retrieved via the Internet: https://web.archive.org/web/20170730132802/http://en.wikipedia.org/wiki/Diff_utility (dated Jul. 30, 2017) 10 pages.
Navigation Data Standard—Wikipedia [online] [retrieved Jan. 6, 2020]. Retrieved via the Internet: https://en.wikipedia.org/w/index.php?title=Navigation_Data_Standard&o . . . (dated Feb. 14, 2015) 3 pages.
About SQLite [online] [retrieved Jan. 30, 2020]. Retrieved via the Internet: https://web.archive.org/web/20170725133731/https://www.sqlite.org/about.html (dated Jul. 25, 2017) 2 pages.
Binary diff [online] [retrieved Jan. 6, 2020]. Retrieved via the Internet: http://www.daemonology.net/bsdiff/ (dated 2003) 1 page.
Chawathe, S. S. et al., *Change Detection in Hierarchically Structured Information*, SIGMOD '96 (Jun. 1996) 493-504.
Kriegel, H-P. et al., *Using set of Feature Vectors for Similarity Search on Voxelized CAD Objects*, ACM SIGMOD 2003 Int. Conf. on Management of Data (Jun. 2003) 12 pages.
Lüdtke, D. et al., *Update of File-System-Based Navigation Databases*, IEEE Vehicular Technology Conference (May 2008) 3006-3010.
Pfeifle, M., *Spatial Database Support for Virtual Engineering*, Dissertation, Ludwig-Maximilians-Universität, München (2004) 346 pages.
Weijermars, W., *Analysis of Urban Traffic Patterns Using Clustering*, Thesis, The Netherlands TRAIL Research School (2007) 213 pages.
Office Action for European Application No. 17 181 456.9 dated Jan. 28, 2020, 5 pages.

* cited by examiner

REDUCING SIZE OF UPDATE PACKAGE DATA FOR NAVIGATION DATABASES

CROSS REFERENCE TO RELATED APPLICATION

This application claims priority to U.S. Provisional Application No. 62/370,711, filed Aug. 4, 2016, the entire contents of which are incorporated herein by reference.

FIELD OF THE DISCLOSURE

The invention relates to the field of updating databases and more specifically to efficiently updating navigation databases.

BACKGROUND

Efficiently updating navigation databases is critical to modern navigation systems that use these navigation databases. In order to allow efficient updating, it is beneficial to reduce the size of update package data that represent incremental updates for these navigation databases.

BRIEF SUMMARY

This may be achieved by keeping stable the order of the navigation data item represented in the navigation database to be updated and the updated navigation database. For instance, in the Navigation Data Standard (NDS) developed by the NDS Association, routing links and other navigation data items are organized in lists in the navigation database. These navigation data items may be referenced by pointing to their position in a list. When positions of such data items change, the data references pointing to the position of these navigation data items must be updated accordingly which significantly increases the update package data size containing update data representing specific update instruction for each difference between the navigation database to be updated and the updated navigation database.

However, the increasing demand for bandwidth reduction requires further update package data size reduction.

It is thus, inter alia, an object of the present invention to allow for a further reduction of the size of update package data for navigation databases.

According to a first aspect of the invention, a method is disclosed, the method comprising:
 identifying, in or after a second process of compiling data that yields a second navigation database, a navigation data item having a changed position in a list of the second navigation database, wherein the changed position of the navigation data item is different to a previous position of the navigation data item in a list of a first navigation database which is yield from a first process of compiling data performed before the second process of compiling data,
 generating first update data for updating the first navigation database to an intermediate navigation database in a first updating step, wherein the first update data represents update generic instructions and/or information for changing a data reference pointing to the previous position of the identified navigation data item to a data reference pointing to the changed position of the identified navigation data item.

This method may for instance be performed and/or controlled by one or more apparatuses, in particular by a server or a server cloud, or by a part of a server or server cloud. For example, this method may be performed and/or controlled by any one embodiment of the below disclosed apparatuses according to the first aspect of the invention.

The method according to the first aspect of the invention may be a method for generating update data for updating the first navigation database (e.g. for updating the first navigation database to the second navigation database).

According to the first aspect of the invention, a computer program code is disclosed, the computer program code when executed by a processor causing an apparatus to perform the steps of the method according to the first aspect of the invention. The computer program code may be stored on computer-readable storage medium (e.g. a tangible computer-readable storage medium). The computer readable storage medium could for example be a disk or a memory or the like. The computer program code could be stored in the computer readable storage medium in the form of instructions encoding the computer-readable storage medium. The computer readable storage medium may be intended for taking part in the operation of a device, like an internal or external memory (e.g. a Read-Only Memory (ROM)) or hard disk of a computer, or be intended for distribution of the program, like an optical disc.

According to the first aspect of the invention, an apparatus is disclosed, which comprises means for performing the method according to the first aspect of the invention. The means of the apparatus can be implemented in hardware and/or software. They may comprise for instance at least one processor for executing computer program code for performing the required functions, at least one memory storing the computer program code, or both. Alternatively, they could comprise for instance circuitry that is designed to implement the required functions, for instance implemented in a chipset or a chip, like an integrated circuit. In general, the means may comprise for instance one or more processing means.

According to the first aspect of the invention, an apparatus is disclosed, which comprises at least one processor and at least one memory including computer program code, the at least one memory and the computer program code configured to, with the at least one processor, cause an apparatus at least to perform at least partially the method and/or the steps of the method according to the first aspect of the invention.

The disclosed apparatuses may be modules or components for a device, for example chips. Alternatively, the disclosed apparatuses may be devices, for instance servers or server clouds (e.g. a plurality of servers that jointly provide a service). The disclosed apparatuses may comprise only the disclosed components (e.g. means) or may further comprise one or more additional components.

In the following, further exemplary features and embodiments of the first aspect of the invention will be described.

The first and second process of compiling data may be performed by a compiler, which may for instance be or be part of an apparatus that performs and/or controls the method according to the first aspect of the invention. The process of compiling data may be a process, in which an original representation of data of a raw data base (e.g. a first and second raw database for the first and second processes of compiling data, respectively) is transformed into another representation of the data of a compiled database (e.g. the first and second navigation database for the first and second processes of compiling data, respectively). For instance, the original representation may be a textual representation of data and the other representation may be binary representation. A binary representation, which may for instance be more compact than the original (e.g. textual) representation, allows for using the compiled database in an embedded environment with strict resource requirements, in particular memory limitations. The first navigation database and/or the second navigation database are such compiled databases.

The raw data of the raw database input in the process of compiling may be in the form of extensible-markup-language-files (XML-files). The raw database may for instance be a database with raw data in the form of for instance relational tables. The raw data may for instance be navigation data item. The raw database may for instance be an Oracle Database.

The first navigation database and the second navigation database may be databases with data in the form of for instance binary encoded data. For instance, the first navigation database and the second navigation database may be SQL (Structured Query Language) databases (e.g. SQLlite databases).

For instance, the first navigation database and the second navigation database may contain map data representing a map of a specific geographic region on earth. For instance, the map data represents a two- or three-dimensional map of the specific geographic region on earth and/or a travel network map (e.g. a road map) of the specific geographic region on earth.

The second navigation database may be an updated version of the first navigation database. For instance, the map data of the second navigation database may represent an updated version of the map represented by the map data of the first navigation database.

The data structure of the first navigation database and structure of the second navigation database may at least partially correspond to each other. This may be understood to mean that navigation data items of the first navigation database and navigation data items of the second navigation database are at least partially organized in corresponding data structures, for instance corresponding files, tables, lists or binary large objects (BLOBs).

For instance, the list of the first navigation database and the list of the second navigation database may be corresponding lists. Corresponding lists of the first navigation database and the second navigation database may at least partially contain the same navigation data items at the same or at different positions. For instance, if one or more new navigation data items have been inserted in a list of the second navigation database in the second compiling process that are not contained in a corresponding list of the first navigation database, the position of one or more navigation data items that are already contained in the list of the first navigation database may be changed in the list of the second navigation database.

Identifying a navigation data item having a changed position in a list of the second navigation database may be understood to mean that a navigation data item is identified that is contained at different positions in corresponding lists of the first navigation database and the second navigation database. The position of this identified navigation data item in the first navigation database may be referred to as previous position; and the position of this identified navigation data item in the second navigation database may be referred to as changed position.

The list of the first navigation database and the list of the second navigation database may be positional lists in which a navigation data item is referencable by pointing to its position in the list. Accordingly, a data reference of the first navigation database may reference the identified navigation data item by pointing to the previous position of the identified navigation data item, and a data reference of the second navigation database may reference the identified navigation data item by pointing to the changed position of the identified navigation data item.

The first update data represents generic update instructions and/or information for changing a data reference (e.g. any data reference) pointing to the previous position of the identified navigation data item to a data reference pointing to the changed position of the identified navigation data item. Due to the use of such generic update instructions and/or information, the size of the first update data is not or is less dependent on the number of data references referencing to the identified data that have to be updated than update data that represent update instructions for each difference between the first navigation database and the intermediate navigation database. This results in a more compact size of the first update data than a size of update data representing specific update instructions and/or information for each data reference that is to be updated.

For instance, the first update data may be indicative of the previous position of the identified data item and the changed position of the identified data item and the list without specifying the data references that are to be changed. These indications may be useable as generic update instructions and/or information for changing a data reference (e.g. any data reference) pointing to the previous position of the identified navigation data item to a data reference pointing to the changed position of the identified navigation data item. These indications allow a more compact size of the first update data than a size of update data representing specific update instructions and/or information for each data reference that is to be updated.

The present invention thus allows to further reduction of the size of update package data for navigation databases.

The update instructions and/or information represented by the first update data may be used in a first updating step to update the first navigation database to the intermediate navigation database. For instance, the update instructions and/or information represented by the first update data may be configured to enable determining the intermediate navigation database by applying the update instructions and/or information on the first navigation database (e.g. on data references of the first navigation database pointing to the previous position) in a first updating step.

The intermediate navigation database may contain one or more data references pointing to the changed position of the identified navigation data item. For instance, the intermediate navigation database may not contain any data reference pointing to the previous position of the identified navigation data item. The intermediate navigation database may be determined by applying the update instructions and/or information of the first update data on the first navigation database (e.g. on data references of the first navigation database pointing to the previous position) in a first updating step.

According to an exemplary embodiment of the first aspect of the invention, the identified navigation data item is associated with and/or represents a map-related object.

For instance, the identified navigation data item may at least partially define the map-related object. Further features and/or attributes of the map-related object may be defined by one or more navigation data items referencing the identified navigation data item by a data reference pointing to the position of the identified navigation data item.

A map-related object is for instance a link such as a road link. A link may be a section of a travel network, for example a section between two junctions of the travel network. A link may be a directional link (i.e. only relating to one travel direction on the link) or a non-directional link (relating to more than one travel direction on the link).

Other examples of map-related objects are lines, areas, points, etc. which may for instance be used for displaying a graphical representation of the map.

The list of the first navigation database and the list of the second navigation database may only contain navigation data items associated with the same type of map-related object. For instance, the list of the first navigation database and the list of the second navigation database may be link lists only containing navigation data items that are associated with a link.

According to an exemplary embodiment of the first aspect of the invention, the first update data contains update information indicative of data structures of the first navigation database containing one or more data references pointing to the previous position of the identified navigation data item in the list of the first navigation database. For instance, only the data structures of the first navigation database indicated by the update information are considered in the first updating step. This may have the effect that the process load during the first updating step is reduced.

For instance, the first update data contains an update data structure list, wherein each entry of the update data structure list represents information indicative of a data structure of the first navigation database containing one or more data references pointing to the previous position of the identified navigation data item in the list of the first navigation database that is to be considered in the first updating step.

As described above, the first navigation database and the second navigation database may contain map data representing a map of a specific geographic region on earth. This map data may be partitioned into tile data sets, wherein each tile data set may represent a map of the intersection of a predetermined tile with the specific geographic region. For example, a geographical area such as the surface of the earth may be sub-divided into predetermined tiles. The tiles are for example tiles of a regular or irregular grid and/or a geographic grid. Each tile may be associated with a tile identifier (e.g. a unique tile identifier). Accordingly, each tile data set may comprise the tile identifier of the tile a map of an intersection of which with the specific geographic region is represented by the tile data. Moreover, there may be tiles at different tile levels. A tile data set may comprise a plurality of data structures such as a plurality of BLOBs, for instance each data structure of a specific tile data set of a specific tile contains a tile identifier of the specific tile.

There may be data references pointing to the previous position of the identified navigation data item in the first navigation database not only from navigation data items of the same tile data set, but also from navigation data sets of other tile data sets, for instance tile data sets of neighboring tiles and/or of higher and/or lower level tiles. For instance, the above described update data structure list may contain the tile identifiers of the tile data sets containing data references pointing to the previous position of the identified navigation data item in the first navigation database that are to be considered in the first updating step. Alternatively or additionally, the update information may only indicate a high-level tile which defines a specific region, wherein all tile data sets (i.e. also lower-level tile data sets) of tiles at least partially overlapping this specific region are to be considered in the first updating step.

According to an exemplary embodiment of the first aspect of the invention, the first update data contains, for each navigation data item of the list of the first navigation database, generic update instructions and/or information indicative of a position of the respective navigation data item in the list of the second navigation database.

For instance, the first update data contains an update position list, wherein each entry of the update position list is associated with a navigation data item of the list of the first navigation database and represents information indicative of a position of the associated navigation data item in the list of the second navigation database.

The update position list may be represented by a binary list and/or a byte sequence. An example of such a byte sequence may be as follows: 0003 001F FFFF 000A . . . . This example byte sequence could mean that the navigation data item stored at previous position "0" (i.e. in the list of the first navigation database) is moved to changed position "0003" (=3) (i.e. in the list of the second navigation dataset), the navigation data item stored at previous position "1" is moved to changed position "001F" (=31), the navigation data item stored at previous position "2" is deleted and is not contained in the list of the second navigation dataset which may be indicated by an exceptional value "FFFF", the navigation data item stored at previous position "3" is moved to changed position "000A" (=10), and so forth.

This may have the effect that the first update data may be represented in a very size-efficient format by simply listing the positions of the navigation data items in the list of the second navigation database, for instance in a binary list and/or a byte sequence.

According to an exemplary embodiment of the first aspect of the invention, the first update data further represents update instructions and/or information for changing the previous position of the navigation data item in the list to the changed position.

As described above, the first update data may be indicative of the previous position of the identified data item and the changed position of the identified data item and the list without specifying the data references that are to be changed. These indications may be additionally useable as update instructions and/or information for changing the previous position of the identified navigation data item in the list to the changed position in a first updating step. For instance, the identified data item may be removed from the previous position in the list and inserted at the changed position in the list.

Furthermore, the first update data may further represent update instructions and/or information for inserting a dummy navigation data item at the previous position of the navigation data item in the list. The dummy data item may have the same size than the identified data item. This may have the effect that the other data items of the list are not affected by changing the position of the identified navigation data item in the list to the changed position.

Alternatively or additionally, the first update data may further represent update instructions and/or information for inserting a dummy navigation data item at one or more positions in the list. For instance, the first update data may be indicative of one or more position where a dummy navigation data item is to be inserted. These indications may be useable as update instructions and/or information for inserting a dummy navigation data items at the one or more positions in the list.

According to an exemplary embodiment of the first aspect of the invention, a plurality of navigation data items having a changed position in a list of the second navigation database is identified and the method is performed for each of these identified navigation data items as identified navigation data item. Accordingly, the first update data may represent generic update instructions and/or information for changing a data reference pointing to a previous position to a data reference pointing to a changed position for each of the identified navigation data items.

According to an exemplary embodiment of the first aspect of the invention, the method further comprises:
determining the intermediate navigation database at least partially based on the first update data and the first navigation database.

As described above, the update instructions and/or information represented by the first update data may be configured to enable determining the intermediate navigation database by applying the update instructions and/or information on the first navigation database (e.g. on data references of the first navigation database pointing to the previous position). The determining may be performed in a first updating step.

The intermediate navigation database may for instance be determined by:
identifying one or more data references of the first navigation database pointing to the previous position of the identified data item, for instance by searching such data references in the first navigation database and/or in data structures of the first navigation database indicated in the first update data to contain one or more data references pointing to the previous position of the identified navigation data item in the list of the first navigation database,
changing (e.g. replacing or editing) the one or more identified data references pointing to the previous position of the identified data item to data references pointing to the changed position of the identified data item.

As a result of the determining, the intermediate navigation database may be obtained.

According to an exemplary embodiment of the first aspect of the invention, the intermediate navigation database and the second navigation database serve as inputs to a process of generating second update data for updating the intermediate navigation database to the second navigation database in a second updating step.

For instance, the method according to the first aspect of the invention further comprises:
generating the second update data.

The second update data may be generated at least partially based on identifying differences between the intermediate navigation database and the second navigation database. The second update data may represent specific update instructions and/or information for each of these differences.

For instance, the second update data may represent specific update instructions and/or information configured to enable determining the second navigation database by applying the update instructions and/or information on the intermediate navigation database in a second updating step.

For instance, the method according to the first aspect of the invention further comprises:
determining the second navigation database at least partially based on the second update data and the intermediate navigation database.

As described above, the specific update instructions and/or information represented by the second update data may be configured to enable determining the second navigation database by applying the update instructions and/or information on the intermediate navigation database in a second updating step. As a result of the determining, the second navigation database may be obtained.

The determining may be performed in a second updating step subsequent to a first updating step. Due to the first updating step in which the data references referencing to the identified data item may have already been updated, the number of differences between the intermediate navigation database and the second navigation database is lower than the number of differences between the first navigation database and the second navigation database which results in a more compact size of the second update date compared to the size of update data generated based on differences between the first navigation database and the second navigation database.

As already described above, the size of the first update data may be more compact than a size of update data representing specific update instructions and/or information for each data reference that is to be updated.

By using two subsequent updating steps for updating the first navigation database to the second navigation database, the overall size of the update package data containing the first update data and the second update data may thus be reduced compared to a case where the first navigation database is updated to the second navigation database in only one updating step.

The present invention, thus allows to further reduction of the size of update package data for navigation databases.

According to an exemplary embodiment of the first aspect of the invention, the method further comprises:
providing update package data containing the first update data to a navigation device for updating a navigation data base of the navigation device corresponding to the first navigation database to the second navigation database.

The update package data may additionally comprise the second update data as described above.

Providing the update package data to the navigation device may be understood to mean that the update package data are transmitted or caused to be transmitted to the navigation device by an apparatus performing the method according to the first aspect of the invention (e.g. by a server). For instance, the update package data may be transmitted to the navigation device by transmitting the update package data in a signal or as part of a signal by transmitting means of an apparatus that performs and/or controls the method according to the first aspect of the invention, for instance a communication interface such as a network interface and/or radio interface (e.g. a transmitter and/or a transceiver). In certain exemplary embodiments of the first aspect of the invention, the signal may be a cellular radio signal or a Bluetooth radio signal or a wireless local area network (WLAN) signal.

According to an exemplary embodiment of the first aspect of the invention, the first navigation database and the second navigation database are databases according to or at least partially compatible with the Navigation Data Standard. The Navigation Data Standard (NDS) is standardized by the NDS association. The website of the NDS association is presently available under the following link: http://www.nds-association.org.

According to a second aspect of the invention, a method is disclosed, the method comprising:
holding available a first navigation database,
receiving update package data containing first update data for updating the first navigation database to an intermediate navigation database,
determining, in a first updating step, the intermediate navigation database at least partially based on the first update data and the first navigation database, wherein the first update data represents generic update instructions and/or information for changing a data reference pointing to a previous position of a navigation data item in a list of the first navigation database to a data reference pointing to a changed position of the navigation data item, wherein the changed position of the navigation data item is different to the previous position of the navigation data item in the list of the first navigation database.

This method may for instance be performed and/or controlled by one or more apparatuses, in particular by a navigation device, or by a part of a navigation device. An example of a navigation device may be a portable navigation device (e.g. a handheld navigation device), a smartphone with navigation functionality, an embedded navigation device of a vehicle, etc. For example, this method may be performed by any one embodiment of the below disclosed apparatuses according to the second aspect of the invention.

The method according to the second aspect of the invention may be a method for updating the first navigation database (e.g. for updating the first navigation database to a second navigation database).

According to the second aspect of the invention, a computer program code is disclosed, the computer program code when executed by a processor causing an apparatus to perform the steps of the method according to the second aspect of the invention. The computer program code may be stored on computer-readable storage medium (e.g. a tangible computer-readable storage medium). The computer readable storage medium could for example be a disk or a memory or the like. The computer program code could be stored in the computer readable storage medium in the form of instructions encoding the computer-readable storage medium. The computer readable storage medium may be intended for taking part in the operation of a device, like an internal or external memory (e.g. a Read-Only Memory (ROM)) or hard disk of a computer, or be intended for distribution of the program, like an optical disc.

According to the second aspect of the invention, an apparatus is disclosed, which comprises means for performing the method according to the second aspect of the invention. The means of the apparatus can be implemented in hardware and/or software. They may comprise for instance at least one processor for executing computer program code for performing the required functions, at least one memory storing the computer program code, or both. Alternatively, they could comprise for instance circuitry that is designed to implement the required functions, for instance implemented in a chipset or a chip, like an integrated circuit. In general, the means may comprise for instance one or more processing means.

According to the second aspect of the invention, an apparatus is disclosed, which comprises at least one processor and at least one memory including computer program code, the at least one memory and the computer program code configured to, with the at least one processor, cause an apparatus at least to perform at least partially the method and/or the steps of the method according to the first aspect of the invention.

The disclosed apparatuses may be modules or components for a device, for example chips. Alternatively, the disclosed apparatuses may be devices, for instance navigation devices or parts of navigation devices. The disclosed apparatuses may comprise only the disclosed components (e.g. means) or may further comprise one or more additional components.

In the following, further exemplary features and embodiments of the second aspect of the invention will be described.

The first navigation database, the intermediate navigation database and the second navigation database may correspond to the first navigation database, the intermediate navigation database and the second navigation database as described above with respect to the first aspect of the invention.

Holding available a first navigation database may be understood to mean that the first navigation database is stored in a memory (e.g. a storage medium), which may for instance be part of an apparatus that performs and/or controls the method according to the second aspect of the invention.

Receiving the update package data may be understood to mean that the update package data is received in a signal or as part of a signal (e.g. a network and/or radio signal). The update package data may for example be received in such a signal or as part of such a signal by receiving means of an apparatus that performs and/or controls the method according to the second aspect of the invention, for instance a communication interface such as a network interface and/or radio interface (e.g. a receiver and/or a transceiver). In certain exemplary embodiments of the second aspect of the invention, the signal may be a cellular radio signal or a Bluetooth radio signal or a wireless local area network (WLAN) signal. Alternatively or additionally, receiving the update package data may be understood to mean that the update package data is made accessible to and/or retrievable by an apparatus that performs and/or controls the method according to the second aspect of the invention, for instance by receiving a storage medium containing the update package data in storage medium reading means (e.g. a storage medium interface such as a storage medium drive or a storage medium connector).

The update package data and the first update data may correspond to the update package data and the first update data as described above with respect to the first aspect of the invention.

As a result of the determining of the first updating step, the intermediate navigation database may be obtained. This determining may be performed as described above with respect to the first aspect of the invention.

According to an exemplary embodiment of the second aspect of the invention, the update package data further contains second update data for updating the intermediate navigation database to a second navigation database, and wherein the method further comprises:

determining, in a second updating step, the second navigation database at least partially based on the second update data and the intermediate navigation database determined in the first updating step.

The second update data may correspond to the second update data as described above with respect to the first aspect of the invention. As a result of the determining of the second updating step, the second navigation database may be obtained. This determining may also be performed as described above with respect to the first aspect of the invention.

Updating the first navigation database to the second navigation database is thus performed in two subsequent updating steps (i.e. the first updating step and the second updating step).

According to a third aspect of the invention, a system is disclosed, which comprises at least one apparatus according to the first aspect of the invention (e.g. a server or a server cloud) and at least one apparatus according to the second aspect of the invention (e.g. a navigation device).

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF EXAMPLE EMBODIMENTS

Figure 1A:
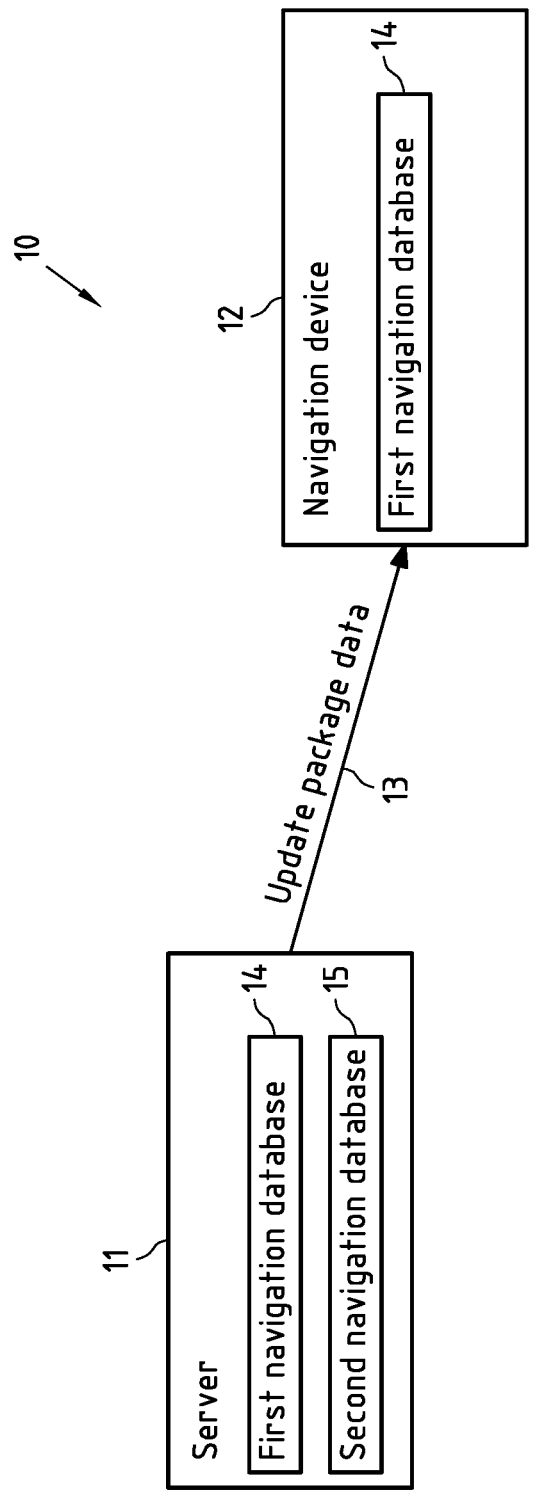
FIG. 1a is a schematic block diagram of a system according to an example embodiment of the present invention.

The following description serves to deepen the understanding of the present invention and shall be understood to complement and be read together with the description of example embodiments of the invention as provided in the above SUMMARY section of this specification.

Incremental map updates are crucial for modern navigation systems. It is especially important that the size of the update package data is as small as possible to reduce bandwidth in the transmission of the update package data. Already some work has been done to generate small update package data. For instance, compact update package data can be created based on algorithms that compare compiled first and second navigation databases (e.g. a navigation database to be updated and an updated navigation database) to each other and try to encode the identified differences as specific update instructions and/or information in a size-efficient way.

However, all of these algorithms need to invest data for each identified difference.

In a compiled navigation database according to or at least partially compatible with the NDS, most of the data may be organized in BLOBs. Furthermore, a lot of navigation data items may be organized in positional lists of such a navigation database in order to save space. In these lists, a navigation data item may be represented by its position in the list rather than by a dedicated identifier. Other navigation data items (e.g. object data items and/or attribute data items) may reference such navigation data items contained in a list by their position in the list (e.g. by a positional list value).

For example, there are RouteUpLinkLists and RouteDownLinkLists in a NDS navigation database which reference navigation data items representing links by data references pointing to their position in the respective LinkList. Similarly, navigation data items representing links connected to SimpleIntersections are referenced by data references pointing to their position in the respective LinkList.

In a similar way, navigation data items representing flexible attributes may refer to navigation data items representing links by data references pointing to their position in the respective LinkList. For a link which may for instance be at least partially defined by a plurality (e.g. up to 20) of flexible attributes or attribute groups, this means that for each navigation data item representing such an attribute, a data reference pointing to the position of the navigation data item representing the link in the respective LinkList (e.g. a positional list value) is stored along with the navigation data item representing the attribute.

In a NDS database, there may be further navigation data items representing other map-related objects such as lines, points or polygons by data which may be also organized in lists (e.g. LineList, PointList or PolygonList) and which may be referenced by data references pointing to their position in the respective list (e.g. by a positional list value).

If between a to be updated NDS navigation database and an updated navigation database, the positions of the navigation data items in the lists (e.g. LinkList, LineList, PointLists, PolygonList, etc.) is not stable, this may have a significant impact on the size of the update package data due to the number of data references that have to be updated. Obviously, it should thus be a goal of the compiler to keep these lists as stable as possible, but sometimes position changes cannot be avoided.

As mentioned above it could happen that a navigation data item representing a link is referenced up to 20 times by navigation data items representing its own flexible attributes, or by navigation data items representing some up-, down- or SimpleIntersections. If such navigation data item representing a link changes its position, all of these data references have to be updated which results in a significant increase of the update package data size.

The present invention allows minimizing the impact of such position changes and data reference updates when generating update package data.

FIG. 1a is a schematic block diagram of a system 10 according to an example embodiment of the third aspect of the invention. System 10 exemplarily comprises a server 11 and a navigation device 12. In the example embodiment of FIG. 1, a compiled first navigation database 14 is comprised by both server 11 and device 12, and a compiled second navigation database 15 is comprised by server 11.

For instance, navigation device 12 is or forms a part (e.g. as a module) of a Portable Navigation Device (PND), a smartphone, a tablet computer, a notebook computer, a navigation watch, or a navigation device that is embedded in a vehicle, e.g. in the form of an in-dash device. Both server 11 and navigation device 12 may each comprise one or more compiled navigation databases (e.g. respectively pertaining to different geographical regions).

Server 11 may be a server for compiling navigation databases (e.g. raw navigation databases) and storing navigation databases, e.g. raw navigation databases and/or compiled navigation databases. For instance, server 11 is a single apparatus, but server 11 may equally well represent several apparatuses (e.g. a server cloud).

In a compiled navigation database, e.g. in a compiled navigation database according to the NDS, navigation data items representing links which are organized in LinkLists are stored as described above. In a corresponding raw navigation database, navigation data items representing the links may have permanent LinkIDs.

Server 11 is exemplarily configured to perform the method according to the first aspect of the invention.

Server 11 may transmit update package data to navigation device 12. The update package data may contain update data for updating first navigation database 14 of navigation device 12. For instance, the update package data may contain first update data for updating the first navigation database 14 to an intermediate navigation database in a first updating step and second update data for updating the intermediate navigation database to the second navigation database 15 in a second updating step.

Navigation device 12 may be exemplarily configured to perform the method according to the second aspect of the invention.

Figure 1B:
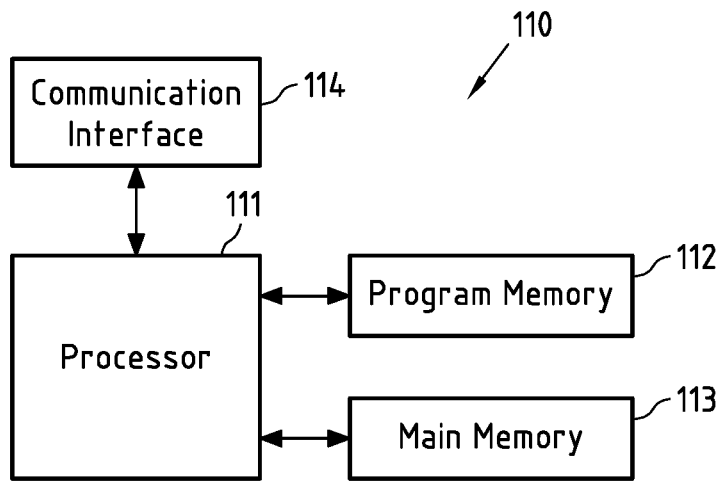
FIGS. 1b-1c are schematic block diagrams of apparatuses according to the first and second aspect of the invention.

FIG. 1b is a schematic block diagram of an example embodiment of an apparatus 110 according to the first aspect of the invention. Apparatus 110 may for instance represent at least a part (e.g. a functional unit or module) of server 11 (see FIG. 1a).

Apparatus 110 comprises a processor 111. Processor 111 may represent a single processor or two or more processors, which are for instance at least partially coupled, for instance via a bus. Processor 111 executes a program code stored in program memory 112 (for instance program code causing apparatus 110 to perform one or more of the embodiments of a method (or parts thereof) according to the first aspect of the invention (as for instance further described below with reference to FIG. 2), when executed on processor 111), and interfaces with a main memory 113. Some or all of memories 112 and 113 may also be included into processor 111. One of or both of memories 112 and 113 may be fixedly connected to processor 111 or at least partially removable from processor 111, for instance in the form of a memory card or stick. Program memory 112 may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples.

Program memory 112 may also comprise first navigation database 14 and second navigation database 15; optionally, program memory 112 may comprise a first raw database and a second raw database. Moreover it may comprise an operating system for processor 111. Program memory 112 may for instance comprise a first memory portion that is fixedly installed in apparatus 110, and a second memory portion that is removable from apparatus 110, for instance in the form of a removable SD memory card.

Main memory 113 may for instance be a volatile memory. It may for instance be a DRAM memory, to give a non-limiting example. It may for instance be used as a working memory for processor 111 when executing an operating system and/or programs.

Processor 111 further controls an communication interface 114 configured to communicate with other devices (e.g. with navigation device 12), for example by receiving and/or transmitting data and/or information. The communication may for example be based on a wireless communication connection. The communication interface 104 may thus comprise circuitry such as modulators, filters, mixers, switches and/or one or more antennas to allow wireless transmission and/or reception of signals. In embodiments of the invention, communication interface 114 is inter alia configured to allow communication based on a 2G/3G/4G/5G cellular radio communication and/or a non-cellular radio communication, such as for instance a WLAN communication. Alternatively or additionally, the communication may equally well be based on a wirebound communication connection or a combination of wireless and wirebound communication connections. Accordingly, the communication interface 114 may thus comprise circuitry such as modulators, filters, mixers and/or switches to allow a wirebound transmission and/or reception of signals. In embodiments of the invention, communication interface 114 is inter alia configured to allow communication based on an Ethernet communication such as a LAN (Local Area Network) communication.

The components 112-114 of apparatus 110 may for instance be connected with processor 111 by means of one or more serial and/or parallel busses.

It is to be understood that apparatus 110 may comprise various other components.

Figure 1C:
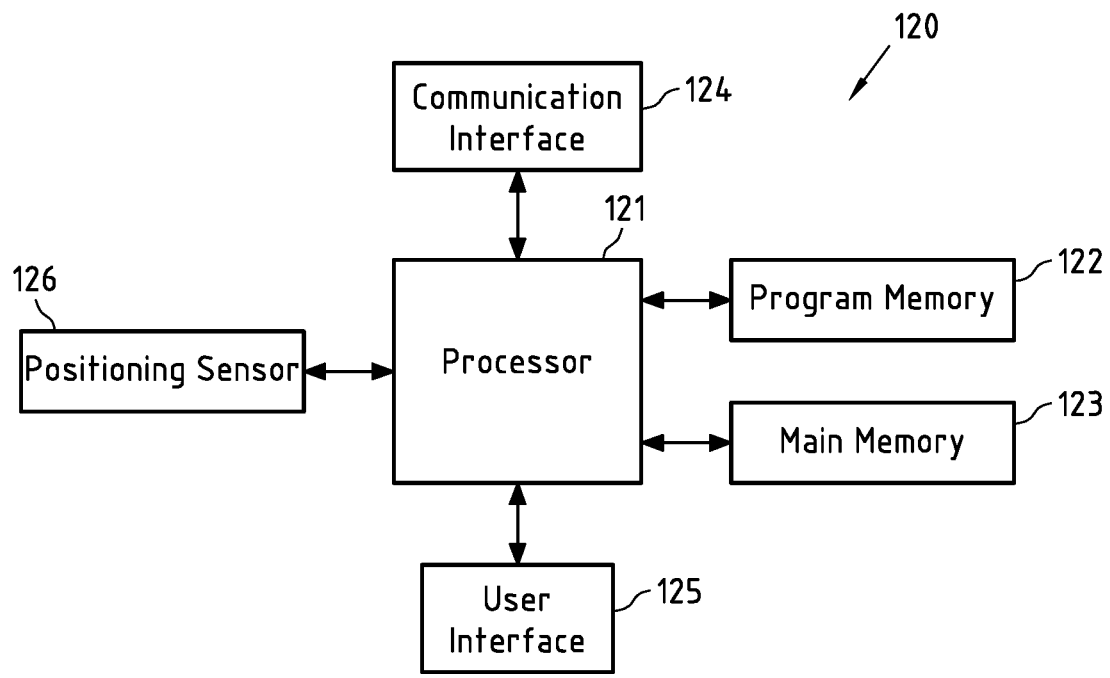

FIG. 1c is a schematic block diagram of an example embodiment of an apparatus 120 according to the second aspect of the invention. Apparatus 120 may for instance represent at least a part (e.g. a functional unit or module) of navigation device 12 (see FIG. 1a).

Apparatus 120 comprises at least one processor 121 and at least one program memory 122. Processor 121 may represent a single processor or two or more processors, which are for instance at least partially coupled, for instance via a bus. Processor 111 executes a program code stored in program memory 122 (for instance program code causing apparatus 120 to perform one or more of the embodiments of a method (or parts thereof) according to the second aspect of the invention (as for instance further described below with reference to FIG. 3), when executed on processor 111), and interfaces with a main memory 123. Some or all of memories 122 and 123 may also be included into processor 121. One of or both of memories 122 and 123 may be fixedly connected to processor 121 or at least partially removable from processor 121, for instance in the form of a memory card or stick. Program memory 122 may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples.

Program memory 122 may also comprise first navigation database 14. Moreover it may comprise an operating system for processor 121. Program memory 122 may for instance comprise a first memory portion that is fixedly installed in apparatus 120, and a second memory portion that is removable from apparatus 120, for instance in the form of a removable SD memory card.

Main memory 123 may for instance be a volatile memory. It may for instance be a DRAM memory, to give a non-limiting example. It may for instance be used as a working memory for processor 121 when executing an operating system and/or programs.

Processor 121 controls a communication interface 124 configured to communicate with other devices (e.g. with server 11), for example by receiving and/or transmitting data and/or information. Communication interface 124 may corresponds to communication interface 114 as described above. Processor 121 further controls a user interface 125, which may for instance be configured for interaction with a user of apparatus 120. User interface 125 may for instance comprise a display, a keyboard and/or a touch-sensitive surface. Processor 121 interfaces with positioning sensor 126, which may for instance determine the position of apparatus 126. Positioning sensor 126 may for instance comprise a Global Positioning System (GPS) receiver and/or a Global Navigation Satellite System (GLONASS) receiver.

The components 122-126 of apparatus 120 may for instance be connected with processor 121 by means of one or more serial and/or parallel busses.

It is to be understood that apparatus 120 may comprise various other components.

Figure 2:
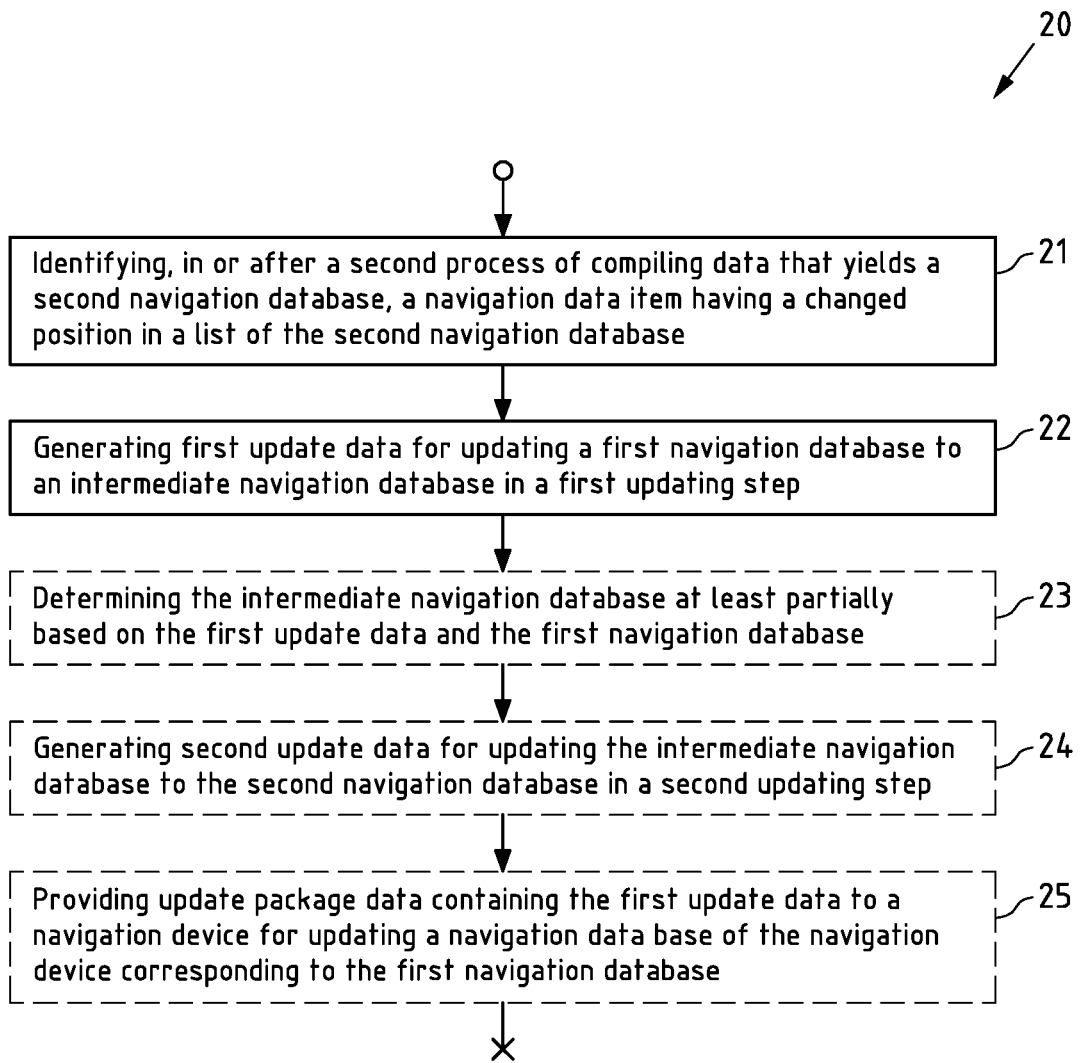
FIG. 2 is a flowchart showing an example embodiment of a method according to the first aspect of the invention.

FIG. 2 is a flowchart 20 of an example embodiment of a method according to the first aspect of the invention. In the following, it is assumed by way of example that the steps and/or actions of this flowchart 20 are performed by server 11 of FIG. 1a or by a part thereof.

In a step 21, a navigation data item having a changed position in a list of second navigation database 15 is identified in or after a second process of compiling data that yields the second navigation database 15. The changed position of the navigation data item is different to a previous position of the navigation data item in a list of the first navigation database 14 which is yield from a first process of compiling data performed before the second process of compiling data.

By way of example, it is assumed in the following that the identified navigation data item represents a link and is contained at different positions in corresponding LinkLists of the first navigation database 14 and the second navigation database 14.

Figure 4:
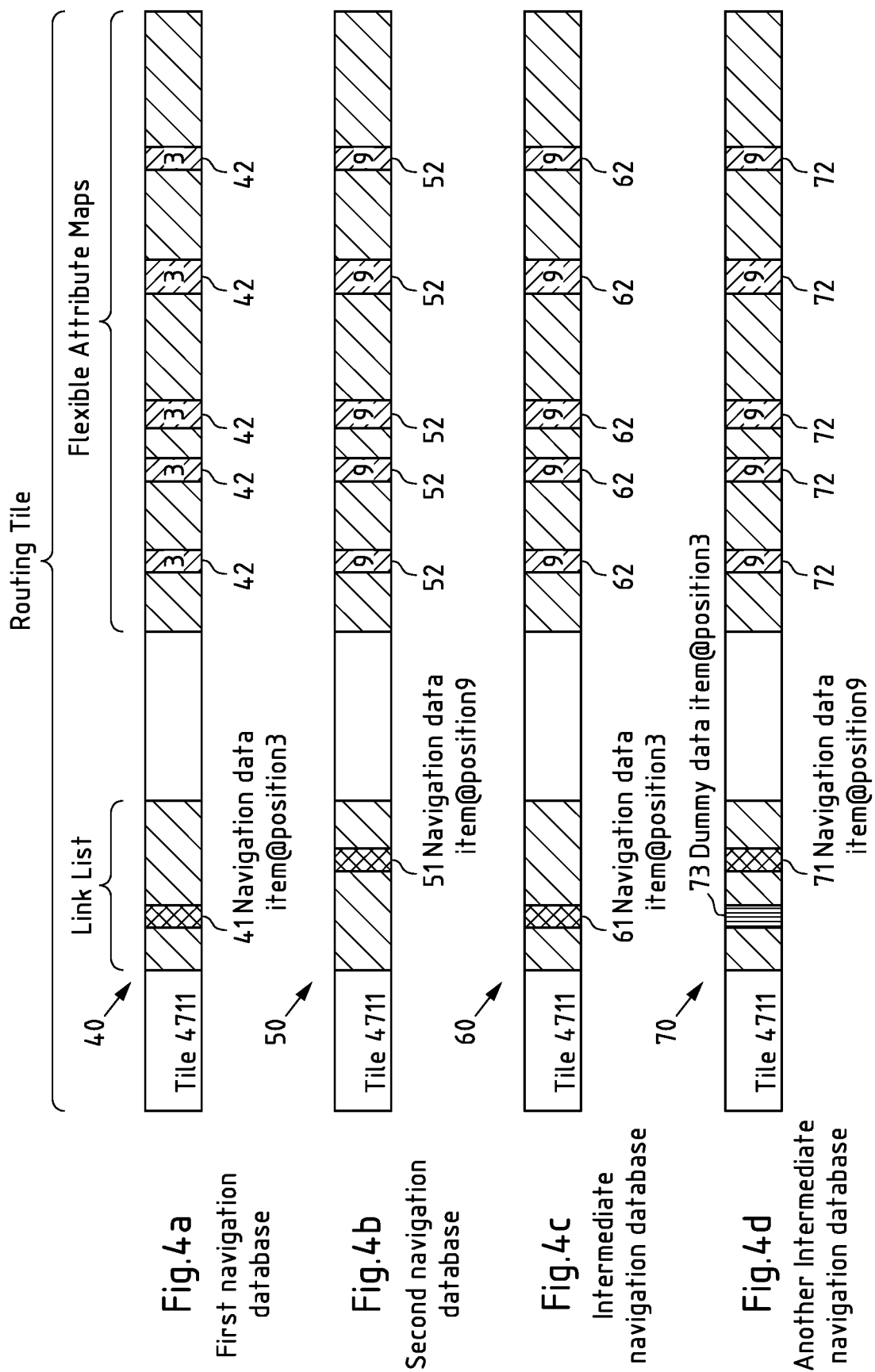
FIGS. 4a-4d are exemplary structures of BLOBs of a first, intermediate or second navigation database according to the invention.

FIG. 4a illustrates an exemplary structure of a routing BLOB 40 of the first navigation database 14 having the TileID 4711. FIG. 4b illustrates an exemplary structure of a corresponding BLOB 50 of the second navigation database having the same TileID 4711. BLOBs 40 and 50 contain various data structures like a LinkList and FlexibleAttributeMaps. In the LinkList of BLOB 40 a navigation data item representing a link is contained at position 3 as indicated by reference sign 41; the same navigation data item is contained at position 9 in the LinkList of BLOB 50 as indicated by reference sign 51. Navigation data item 51 corresponds to navigation data item 41. Accordingly, position 3 may be referred to as previous position and position 9 may be referred to as changed position. Navigation data items representing attributes to the link represented by navigation data items 41 and 51 have data references 42 and 52, respectively. Data references 42 of BLOB 40 point to previous position 3 of navigation data item 41; and data references 52 point to changed position of navigation data item 51. The data references thus have to be changed 5 times from pointing to previous position 3 to pointing to changed position 4 even if the navigation data items representing attributes to the link do not change.

In step 21, navigation data item 51 which corresponds to navigation data item 41 may be identified to have a changed position in a list of second navigation database 15.

Optionally, a plurality of navigation data items having a changed position in a list of the second navigation database may be identified in step 21.

In a step 22, first update data for updating the first navigation database to an intermediate navigation database in a first updating step are generated. The first update data represents generic update instructions and/or information for changing a data reference pointing to the previous position of the identified navigation data item to a data reference pointing to the changed position of the identified navigation data item.

If in step 21 a plurality of navigation data items is identified, the first update data may represent generic update instructions and/or information for changing a data reference pointing to a previous position to a data reference pointing to a changed position for each of the identified navigation data items.

The encoding of the first update data can be done rather space-efficiently. For instance, an SQLite table DataReferenceUpdate(TileID, BLOB) may be or may be part of the first update data. The TileID may specify the TileID of the BLOB that contains the list (e.g. TileID 4711). In each row of this table, a mapping of the previous position of an identified navigation data item to the changed position of this identified navigation data item may be stored. This mapping could basically be a sequence of 2-byte integer values. For instance, the position in this byte sequence may represent the previous position of the identified navigation data item in the list of the first navigation database 14 and the value may represent the changed position in the list of the second navigation database 15. By way of example, for identified navigation data item 51 of FIG. 4b such a byte sequence may be represented as follows: "0001 0002 0009 0004 . . . " which means that navigation data item 51 which corresponds to navigation data item 41 changes its position from previous position 3 in the LinkList of BLOB 40 (i.e. represented by the position in the byte sequence) to position 9 in the LinkList of BLOB 50 (i.e. represented by value "0009" in the byte sequence) and that navigation data items stored at positions 1, 2 and 4 of the LinkList of BLOB 40 remain at their position in the LinkList of BLOB 50. Deletion of navigation data items from the list may be indicated by an exceptional value such as "FFFF".

Figure 5:
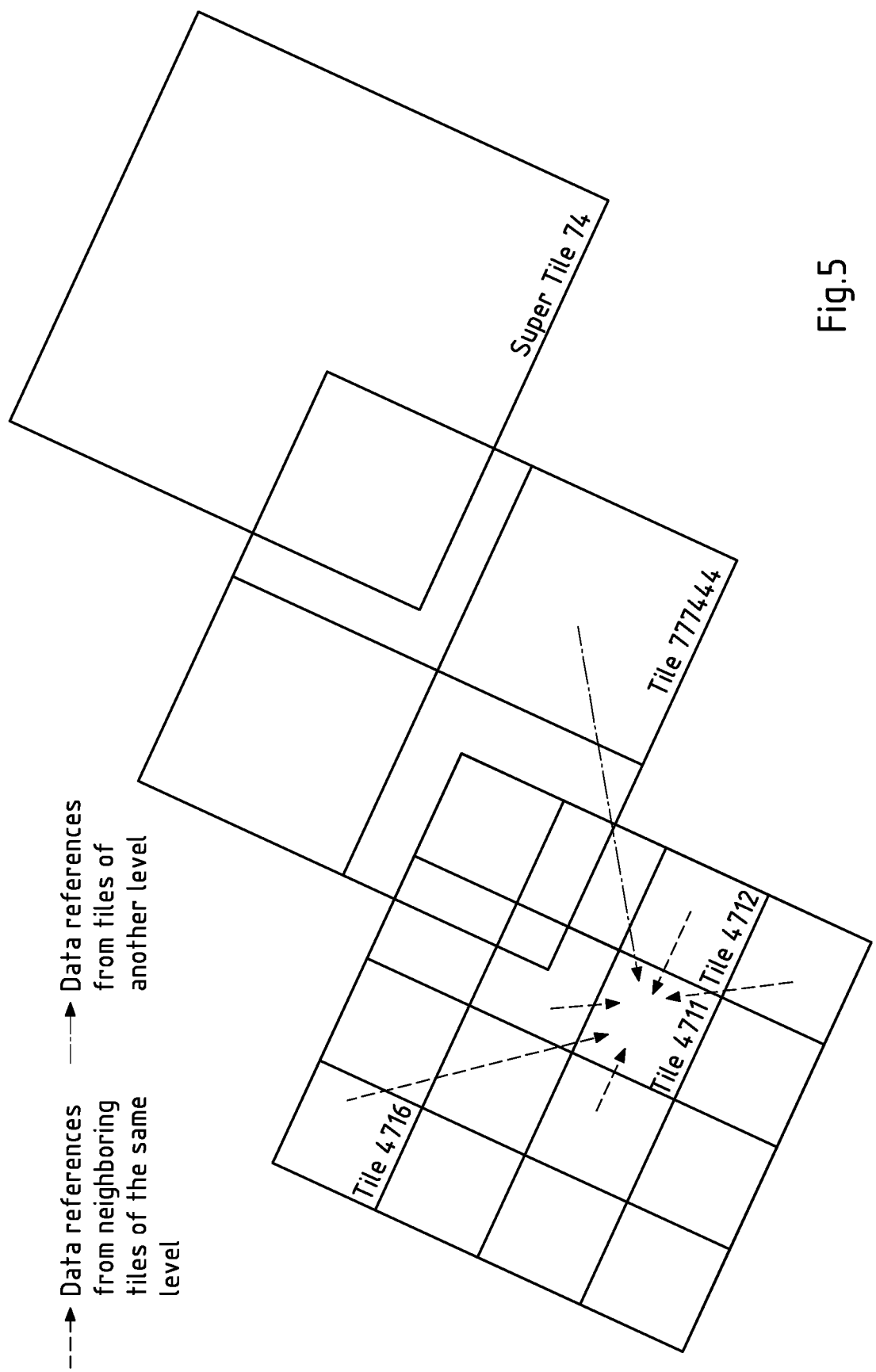
FIG. 5 is exemplary data references of different data structures of a navigation database pointing to a position of a navigation data item in a list of the navigation database.

Optionally, the first update data may contain update information indicative of data structures of the first navigation database 14 containing one or more data references pointing to the previous position of the identified navigation data item in the list of the first navigation database. In FIG. 5, it is exemplary illustrated that there may be different data structures of the first navigation database 14 containing one or more data references pointing to the previous position of the identified navigation data item in the list of the first navigation database.

If the first navigation database 14 is compatible with NDS, there may for instance be routing and guidance-relevant navigation data item for a certain tile (e.g. tile with TileID 4711) not only contained in one BLOB, but in five different BLOBs distributed over two tables. Consequently, each of these different BLOBs may contain a plurality of data references pointing to positions in the LinkList for this tile. For instance, BLOBs in the RoutingAuxTileTable may contain navigation data items representing attributes to links represented by navigation data items stored in the LinkList for this tile which is located in another BLOB RoutingTileTable. Furthermore, there may be data references in BLOBs having a different TileID pointing to positions in the LinkList for this tile.

In FIG. 5 it is exemplary illustrated that BLOBs of neighboring tiles of the tile having TileID 4711 contain data references pointing to positions in the LinkList for the tile having TileID 4711. These data references are indicated by dashed arrows in FIG. 5. They may for instance be due to links crossing the tile border of this tile. Moreover, data references of BLOBs of higher-level tiles pointing to positions in the LinkList for the tile having TileID 4711 are illustrated in FIG. 5 by dotted-dashed arrows.

It may thus be desirable to update, in the first updating step, data references not only in the same BLOB where the LinkList is stored, but also data references pointing to positions in this LinkList which are contained in other BLOBs (e.g. other BLOBs of the same tile, other BLOBs of neighboring tiles of the same level, other BLOBs belonging to tiles of higher-levels and/or lower-levels).

To update these data references efficiently, it may be advantageous to (implicitly or explicitly) indicate in the first update data the BLOBs that are to be considered in the first updating step. By way of example, a higher-level tile (e.g. a SuperTile) may be indicated in the first update data. In this example, all BLOBs for tiles of a certain region which is described by the higher-level tile may be considered in the first updating step. Alternatively or additionally, TileIDs of the BLOBS that are to be considered in the first updating step may be explicitly indicated in the first update data. For instance, these TileIDs may be indicated at the end of the above described byte sequence of the SQLite table DataReferenceUpdate(TileID, BLOB).

In an optional step 23, the intermediate navigation database is determined at least partially based on the first update data and the first navigation database 14.

The update instructions and/or information represented by the first update data may be configured to enable determining the intermediate navigation database by applying the update instructions and/or information on first navigation database 14.

The intermediate navigation database may for instance be determined by:
- identifying one or more data references of the first navigation database pointing to the previous position of the identified data item, for instance by searching such data references in the first navigation database and/or in data structures of the first navigation database indicated in the first update data to contain one or more data references pointing to the previous position of the identified navigation data item in the list of the first navigation database,
- changing (e.g. replacing or editing) the one or more identified data references pointing to the previous position of the identified data item to data references pointing to the changed position of the identified data item.

If the first update data contains update information indicative of data structures of the first navigation database 14 containing one or more data references pointing to the previous position of the identified navigation data item in the list of the first navigation database, the update instructions and/or information represented by the first update data may only be applied on these data structures in step 23. As described above, the first update data may for instance indicate a higher-level tile (e.g. a SuperTile) that described a certain region such that all BLOBs for tiles of this certain region may be considered in step 23. For instance, all BLOBs for tiles of this certain region may be loaded into the main memory allowing an efficient processing. By way of example, SuperTile 47 of covering all tiles depicted in FIG. 5 may be indicated in the first update data. In this example, BLOBs of tiles 4711, 4712, 4716 and higher-level tile 777444 may be loaded into the main memory and considered in step 23. Alternatively or additionally, TileIDs of the BLOBS that are to be considered in the first updating step may be explicitly indicated in the first update data. In this case, only BLOBs having these TileIDs may be loaded into the main memory and considered in step 23.

FIG. 4c illustrates an exemplary structure of a routing BLOB 60 of an intermediate navigation database having the TileID 4711. BLOB 60 may be obtained by applying the update instructions and/or information represented by the first update data on BLOB 40 in step 23. In BLOB 60, all data references 42 of BLOB 40 have been changed to data references 62 pointing to the changed position 9, whereas the LinkList of BLOB 60 still contains navigation data item 61 at previous position 3. In a NDS navigation database, changing of the data references may be done by renaming the data references without any shift in the bit sequence of the BLOB, because all data references occupy 15 bits of space in NDS.

Optionally, the first update data may be also used for adjusting the navigation data items contained in the list in step 23. Especially if the navigation data items contained in the list are of equal size, it is beneficial to adjust these navigation data items as well. This is now explained in more detail with respect to FIG. 4d. FIG. 4d illustrates also an exemplary structure of a routing BLOB 70 of another intermediate navigation database having the TileID 4711. BLOB 70 may be obtained by applying the update instructions and/or information represented by the first update data on BLOB 40 in step 23. Similar to BLOB 60, all data references 42 of BLOB 40 have been changed to data references 72 pointing to the changed position 9 in BLOB 72. Moreover, the LinkList of BLOB 70 already contains navigation data item 71 which corresponds to navigation data item 41 at changed position 9. At the previous position 3, a dummy data item 73 has been inserted in the LinkList of BLOB 70. Since the first update data indicates both the changed position and the previous position, all necessary information for inserting the dummy data item 73 at previous position 3 and for inserting (e.g. rearranging) the navigation data item 71 which corresponds to navigation data item 41 at changed position 9 are already contained in the first update data.

As a result of the determining in optional step 23, the intermediate navigation database may be obtained.

The intermediate navigation database and the second navigation database 15 may serve as inputs to an optional step 24. In optional step 24, second update data for updating the intermediate navigation database to the second navigation database in a second updating step are generated.

The second update data may represent specific update instructions and/or information configured to enable determining the second navigation database by applying the update instructions and/or information on the intermediate navigation database in a second updating step.

For instance, the second update data may be generated at least partially based on identifying differences between the intermediate navigation database and the second navigation database. The second update data may represent specific update instructions and/or information for each of these differences.

Any known technique for determining update data for updating the first navigation database to the second navigation database may be used in optional step 24. For NDS navigation databases such techniques are for instance described in U.S. Ser. No. 14/586,272, U.S. Ser. No. 15/014,597 and PCT patent application PCT/EP2016/062599 which are incorporated by reference.

In an optional step 25, update package data 13 containing the first update data are provided to a navigation device for updating a navigation data base of the navigation device corresponding to the first navigation database to the second navigation database. Optionally, the update package data may for instance also contain the second update data.

For instance, update package data 13 may be transmitted from server 11 to navigation device 12 for updating first navigation database 14 of navigation device 12.

Figure 3:
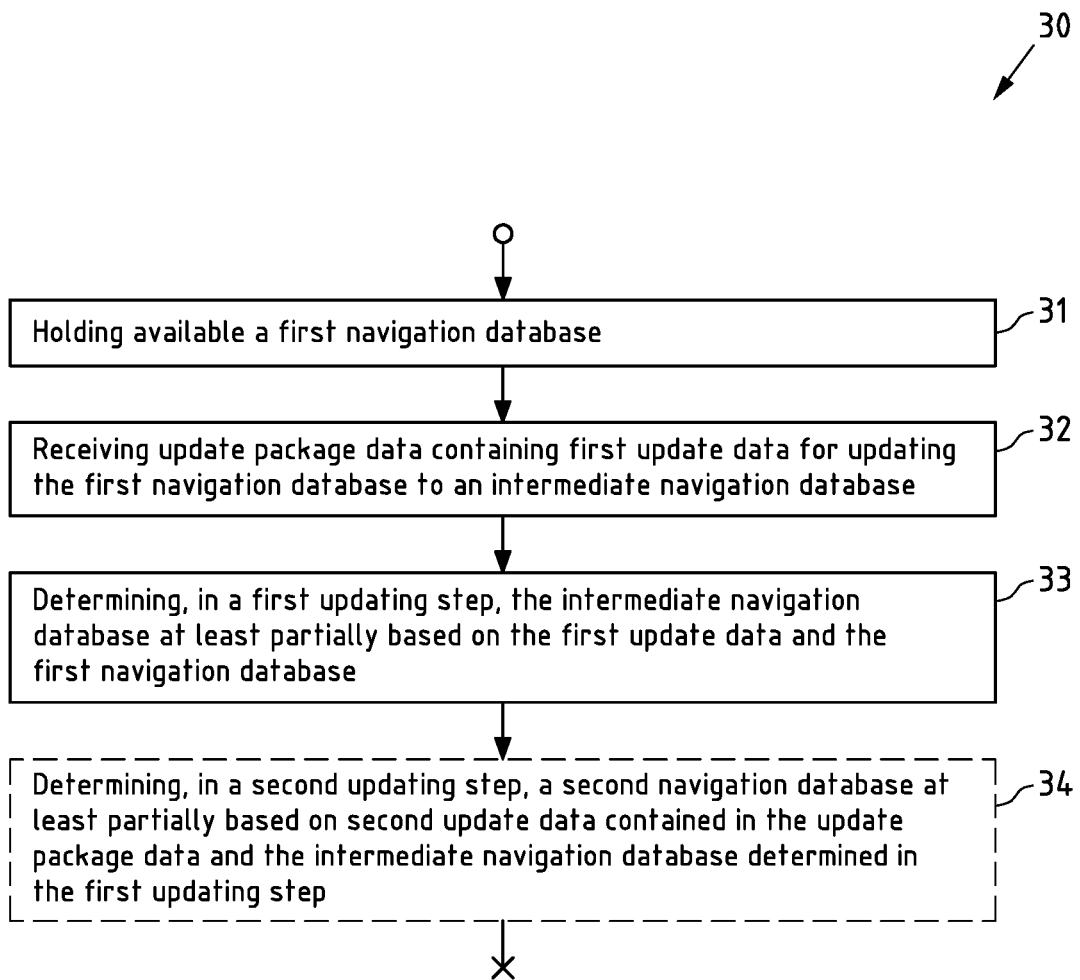
FIG. 3 is a flowchart showing an example embodiment of a method according to the second aspect of the invention.

FIG. 3 is a flowchart 30 of an example embodiment of a method according to the second aspect of the invention. In the following, it is assumed by way of example that the steps and/or actions of this flowchart 30 are performed by navigation device 12 of FIG. 1a or by a part thereof.

In a step 31, first navigation database 14 is hold available. This may be understood to mean that first navigation database 14 is stored in a memory of navigation device 2.

In a step 32, update package data 13 containing first update data for updating the first navigation database to an intermediate navigation database are received. Optionally, the update package data may for instance also contain second update data.

For instance, update package data 13 may be received from server 11 at navigation device 12 for updating first navigation database 14 of navigation device 12.

In a first updating step 33, the intermediate navigation database is determined at least partially based on the first update data and the first navigation database. The first update data represents generic update instructions and/or information for changing a data reference pointing to a previous position of a navigation data item in a list of the first navigation database to a data reference pointing to a changed position of the navigation data item, wherein the changed position of the navigation data item is different to the previous position of the navigation data item in the list of the first navigation database As described above, the update instructions and/or information represented by the first update data may be configured to enable determining the intermediate navigation database by applying the update instructions and/or information on first navigation database 14. The determining in step 33 may be performed as described above with respect to step 23 of flowchart 20.

If the first update data contains update information indicative of data structures of the first navigation database 14 containing one or more data references pointing to the previous position of the identified navigation data item in the list of the first navigation database, the update instructions and/or information represented by the first update data may only be applied on these data structures in step 33. As described above, the first update data may for instance indicate a higher-level tile (e.g. a SuperTile) that described a certain region such that all BLOBs for tiles of this certain region may be considered in step 33. Alternatively or additionally, TileIDs of the BLOBS that are to be considered in the first updating step may be explicitly indicated in the first update data.

By way of example, the update instructions and/or information represented by the first update data may be applied on BLOB 40 as illustrated in FIG. 4a. As a result of this, BLOB 60 as illustrated in FIG. 4c or BLOB 70 as illustrated in FIG. 4d may be obtained.

In an optional second updating step 34, a second navigation database is determined at least partially based on second update data optionally contained in the update package data and the intermediate navigation database determined in the first updating step 33.

As described above, the specific update instructions and/or information represented by the second update data may be configured to enable determining the second navigation database by applying the update instructions and/or information on the intermediate navigation database in a second updating step.

As a result of the determining in step 34, the second navigation database 15 may be obtained.

For instance, the update instructions and/or information represented by the second update data may be applied on BLOB 60 as illustrated in FIG. 4c or BLOB 70 as illustrated in FIG. 4d to obtain BLOB 50 as illustrated in FIG. 4b.

Figure 6:
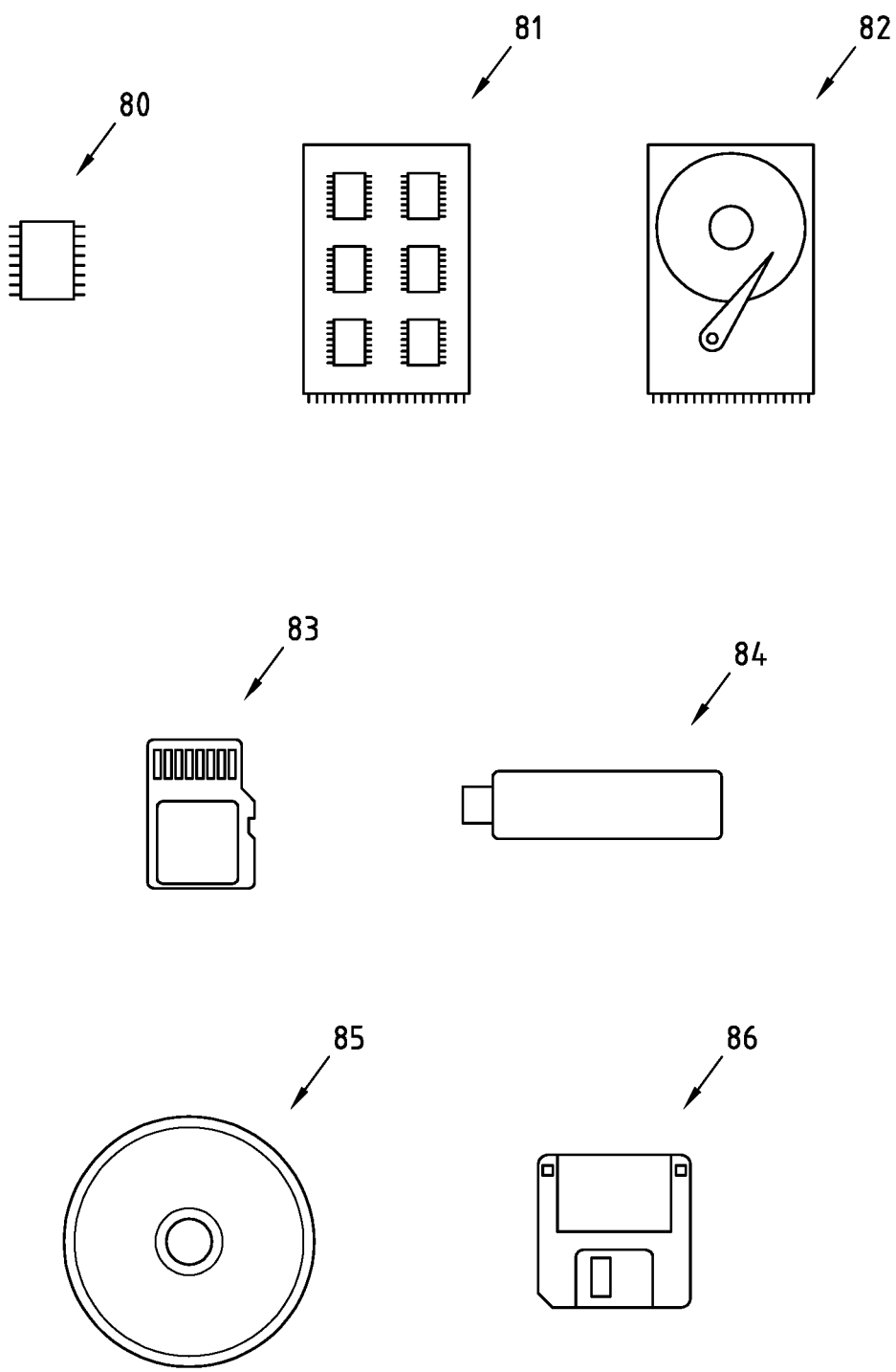
FIG. 6 is a schematic illustration of examples of tangible and non-transitory storage media according to the present invention.

FIG. 6 is a schematic illustration of examples of tangible computer-readable storage media according to the present invention that may for instance be used to implement program memory 112 of FIG. 1b and/or program memory 122 of FIG. 1c. To this end, FIG. 6 displays a flash memory 80, which may for instance be soldered or bonded to a printed circuit board, a solid-state drive 81 comprising a plurality of memory chips (e.g. Flash memory chips), a magnetic hard drive 82, a Secure Digital (SD) card 83, a Universal Serial Bus (USB) memory stick 84, an optical storage medium 85 (such as for instance a CD-ROM or DVD) and a magnetic storage medium 86.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program code) may also be used in a corresponding manner in an example embodiment of any other category. It should also be understood that presence of a feature in the presented example embodiments shall not necessarily mean that this feature forms an essential feature of the invention and cannot be omitted or substituted.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. A method comprising:
identifying, in or after a second process of compiling data that yields a second navigation database, a navigation data item having a changed position in a list of said second navigation database, wherein said changed position of said navigation data item is different to a previous position of said navigation data item in a list of a first navigation database which is yielded from a first process of compiling data performed before said second process of compiling data,
generating first update data for updating said first navigation database to an intermediate navigation database in a first updating step, wherein said first update data represents generic update instructions and/or information for changing a data reference pointing to said previous position of said identified navigation data item to a data reference pointing to said changed position of said identified navigation data item;
determining said intermediate navigation database at least partially based on said first update data and said first navigation database; and
generating second update data for updating said intermediate navigation database to said second navigation database in a second updating step based upon said intermediate navigation database and said second navigation database.

2. The method according to claim 1, wherein said identified navigation data item is associated with and/or represents a map-related object.

3. The method according to claim 1, wherein said first update data contains update information indicative of data structures of said first navigation database containing one or more data references pointing to said previous position of said identified navigation data item in said list of said first navigation database.

4. The method according to claim 1, wherein said first update data contains, for each navigation data item of said list of said first navigation database, generic update instructions and/or information indicative of a position of said respective navigation data item in said list of said second navigation database.

5. The method according to claim 4, wherein said first update data contains an update position list, and wherein each entry of said update position list is associated with a navigation data item of said list of said first navigation database and represents information indicative of a position of said associated navigation data item in said list of said second navigation database.

6. The method according to claim 1, wherein said first update data further represents update instructions and/or information for changing said previous position of said navigation data item in said list to said changed position of said navigation data item in said list.

7. The method according to claim 6, wherein said first update data further represents update instructions and/or information for inserting a dummy navigation data item at said previous position of said navigation data item in said list.

8. The method according to claim 1, said method further comprising:

determining, in a second updating step, said second navigation database at least partially based on said second update data and said intermediate navigation database.

9. The method according to claim 1, said method further comprising:
providing update package data containing said first update data to a navigation device for updating a navigation data base of said navigation device corresponding to said first navigation database to said second navigation database.

10. The method according to claim 1, wherein said first navigation database and said second navigation database are databases according to or at least partially compatible with the Navigation Data Standard.

11. An apparatus comprising at least one processor and at least one memory including computer program code for one or more programs, the at least one memory and the computer program code configured to, with the at least one processor, cause the apparatus to at least:
identify, in or after a second process of compiling data that yields a second navigation database, a navigation data item having a changed position in a list of said second navigation database, wherein said changed position of said navigation data item is different to a previous position of said navigation data item in a list of a first navigation database which is yielded from a first process of compiling data performed before said second process of compiling data,
generate first update data for updating said first navigation database to an intermediate navigation database in a first updating step, wherein said first update data represents generic update instructions and/or information for changing a data reference pointing to said previous position of said identified navigation data item to a data reference pointing to said changed position of said identified navigation data item;
determine said intermediate navigation database at least partially based on said first update data and said first navigation database; and
generate second update data for updating said intermediate navigation database to said second navigation database in a second updating step based upon said intermediate navigation database and said second navigation database.

12. The apparatus according to claim 11, wherein said first update data contains, for each navigation data item of said list of said first navigation database, generic update instructions and/or information indicative of a position of said respective navigation data item in said list of said second navigation database.

13. The apparatus according to claim 12, wherein said first update data contains an update position list, and wherein each entry of said update position list is associated with a navigation data item of said list of said first navigation database and represents information indicative of a position of said associated navigation data item in said list of said second navigation database.

14. The apparatus according to claim 11, wherein said first update data further represents update instructions and/or information for changing said previous position of said navigation data item in said list to said changed position of said navigation data item in said list.

15. The apparatus according to claim 14, wherein said first update data further represents update instructions and/or information for inserting a dummy navigation data item at said previous position of said navigation data item in said list.

16. A non-transitory computer readable storage medium including one or more sequences of one or more instructions which, when executed by one or more processors, cause an apparatus to at least perform:

identifying, in or after a second process of compiling data that yields a second navigation database, a navigation data item having a changed position in a list of said second navigation database, wherein said changed position of said navigation data item is different to a previous position of said navigation data item in a list of a first navigation database which is yielded from a first process of compiling data performed before said second process of compiling data, generating first update data for updating said first navigation database to an intermediate navigation database in a first updating step, wherein said first update data represents generic update instructions and/or information for changing a data reference pointing to said previous position of said identified navigation data item to a data reference pointing to said changed position of said identified navigation data item;

determining said intermediate navigation database at least partially based on said first update data and said first navigation database; and generating second update data for updating said intermediate navigation database to said second navigation database in a second updating step based upon said intermediate navigation database and said second navigation database.

17. The method according to claim 5, wherein said update position list is represented by a byte sequence.

* * * * *